(12) United States Patent
Waag et al.

(10) Patent No.: US 9,925,527 B2
(45) Date of Patent: Mar. 27, 2018

(54) CATALYTICALLY ACTIVE POROUS ELEMENT AND METHOD OF MANUFACTURING SAME

(71) Applicant: Glatt GmbH, Binzen (DE)

(72) Inventors: Ulf Waag, Bad Saeckingen (DE); Norman Reger-Wagner, Bad Klosterlausnitz (DE)

(73) Assignee: GLATT GMBH, Binzen (DE)

( * ) Notice: Subject to any disclaimer, the term of this patent is extended or adjusted under 35 U.S.C. 154(b) by 225 days.

(21) Appl. No.: 14/709,711

(22) Filed: May 12, 2015

(65) Prior Publication Data
US 2015/0328624 A1 Nov. 19, 2015

(30) Foreign Application Priority Data
May 15, 2014 (DE) .................. 10 2014 209 216

(51) Int. Cl.
| | |
|---|---|
| *B01J 23/889* | (2006.01) |
| *B01J 37/02* | (2006.01) |
| *C22C 21/00* | (2006.01) |
| *B01J 37/08* | (2006.01) |
| *B01J 23/75* | (2006.01) |
| *B01J 35/04* | (2006.01) |
| *B01J 35/10* | (2006.01) |
| *B01J 37/00* | (2006.01) |
| *C22C 19/07* | (2006.01) |
| *B22F 3/10* | (2006.01) |
| *B22F 3/11* | (2006.01) |
| *C22C 1/04* | (2006.01) |
| *B01J 21/02* | (2006.01) |
| *B01J 21/04* | (2006.01) |
| *B01J 25/00* | (2006.01) |
| *B01J 27/185* | (2006.01) |
| *B01J 27/22* | (2006.01) |
| *B01J 35/02* | (2006.01) |

(52) U.S. Cl.
CPC ........... *B01J 23/8892* (2013.01); *B01J 21/02* (2013.01); *B01J 21/04* (2013.01); *B01J 23/75* (2013.01); *B01J 25/00* (2013.01); *B01J 27/1853* (2013.01); *B01J 27/22* (2013.01); *B01J 35/023* (2013.01); *B01J 35/04* (2013.01); *B01J 35/10* (2013.01); *B01J 37/0081* (2013.01); *B01J 37/0215* (2013.01); *B01J 37/0219* (2013.01); *B01J 37/08* (2013.01); *B22F 3/1021* (2013.01); *B22F 3/1137* (2013.01); *C22C 1/0433* (2013.01); *C22C 19/07* (2013.01); *C22C 21/00* (2013.01)

(58) Field of Classification Search
CPC ........ B01J 23/8892; B01J 23/75; B01J 23/84; B01J 23/06; B01J 35/023; B01J 35/04; B01J 35/10; B01J 37/0081; B01J 37/0215; B01J 37/0219; B01J 37/08; B22F 3/1021; B22F 3/1137; C22C 1/0433; C22C 1/0441; C22C 19/07
USPC .......... 502/324, 325, 329, 331, 332, 527.24; 420/435, 437–439; 51/309; 148/22, 313
See application file for complete search history.

(56) References Cited

U.S. PATENT DOCUMENTS

| | | | | |
|---|---|---|---|---|
| 3,594,134 | A * | 7/1971 | Russell et al. ...... | B01D 39/2027 164/125 |
| 3,932,204 | A * | 1/1976 | Masumoto et al. ...... | H01F 1/04 148/103 |
| 4,936,270 | A * | 6/1990 | Ushio ................ | B22F 3/26 123/188.8 |
| 6,573,213 | B1* | 6/2003 | Ostgard .............. | B01J 25/02 502/301 |
| 6,926,969 | B2 | 8/2005 | Bohm et al. | |
| 8,021,499 | B2* | 9/2011 | Ishida ............... | C22C 19/07 148/425 |
| 2003/0153981 | A1 | 8/2003 | Wang et al. | |
| 2007/0017803 | A1* | 1/2007 | Ziani .............. | C23C 14/3414 204/298.13 |
| 2009/0250379 | A1* | 10/2009 | Kurtz ............... | B01J 19/0093 208/134 |
| 2011/0000128 | A1 | 1/2011 | Gunnerman et al. | |
| 2012/0164429 | A1* | 6/2012 | Shah ............... | C22C 26/00 428/293.1 |
| 2012/0324801 | A1* | 12/2012 | Fang ................ | B01J 3/062 51/309 |
| 2012/0329889 | A1 | 12/2012 | Yang et al. | |
| 2013/0299562 | A1* | 11/2013 | Piegert ............ | B23K 35/3046 228/119 |
| 2016/0090824 | A1* | 3/2016 | Overstreet ........... | 428/610 |
| 2016/0221152 | A1* | 8/2016 | Alkhalaileh ....... | B24D 18/0009 |

FOREIGN PATENT DOCUMENTS

| | | | | |
|---|---|---|---|---|
| CN | 10-1509085 | * | 8/2009 | |
| CN | 101509085 | | 8/2009 | |
| DE | 10-150948 | * | 5/2003 | ............ B01D 39/20 |
| DE | 10150948 C1 | | 5/2003 | |
| EP | 1935997 A1 | | 6/2008 | |
| WO | 2012/159258 | | 11/2012 | |

* cited by examiner

Primary Examiner — Patricia L. Hailey
(74) Attorney, Agent, or Firm — Jacobson Holman, PLLC.

(57) ABSTRACT

The invention relates to a catalytically active porous element and to a method of manufacturing same. The element is formed with at least 40% by mass cobalt and at least one further chemical element and/or at least one chemical compound which form a matrix into which particles of pure cobalt, of a cobalt alloy or of an intermetallic phase formed with cobalt are embedded. In this respect, the at least one chemical element and/or the at least one chemical compound have a lower sintering temperature and/or melting temperature than cobalt, the respective cobalt alloy or the intermetallic phase. Solely for this purpose or in addition thereto, cobalt can be partially soluble therein and/or can form a eutectic and/or a peritectic together with cobalt.

16 Claims, No Drawings

CATALYTICALLY ACTIVE POROUS ELEMENT AND METHOD OF MANUFACTURING SAME

The invention relates to a catalytically active element and to a method of manufacturing same. The elements in accordance with the invention can preferably be used in the Fischer-Tropsch synthesis.

A technology for manufacturing metallic and ceramic open-cell structures in accordance with the so-called Schwartzwalder process is prior art. In this respect, an open-cell polyurethane foam body is preferably coated with a metal powder binder or a ceramic powder binder suspension and is subsequently debound (removal of the organic components) in a heat treatment and is sintered.

This technology is established for an economic manufacture of areal, open-cell structures.

The structural advantages of foam bodies are sufficiently known:
  Low pressure loss (in comparison with bulk material catalysts)
  Large surfaces (in comparison with pebble beds) allow a process intensification
  Almost ideal flow distribution
    Better mixing of the reactants
    Convective heat distribution simplifies heat management
The advantages of cobalt-based catalysts are:
High thermal conductivity
  Better homogeneity of the temperature (e.g. fewer hot spots in exothermic reactions)
  Better heat transport, simpler heat management (heat dissipation in exothermic reactions at reactor walls)
C5-selectivity in Fischer-Tropsch reactions
Further advantages of a design of cobalt catalysts as solid metal foam bodies are:
  A very good control of the chemical composition can be achieved via the powder-metallurgic manufacture, i.e. harmful elements for reactions can be safely excluded (e.g. no Fe, Ni, Cr, S, Na, Mg, Ca, . . . )
  The strength can be adapted to the demands of the application (by varying the density)
  In comparison with alternative foam body routes (which realize the cobalt either via thin, areal Co coatings (e.g. electrochemical deposition) or via a washcoat)
    No restriction in the carrier selection by unwanted foreign elements
    Less sensitivity to wear and stock removal since the reservoir of cobalt is larger; longer use times result from this A manufacture by way of melting metallurgy is comparatively expensive; in addition, finer structures having higher specific surfaces can only be manufactured with a considerable effort and/or expense.

A manufacture of purely Co foam bodies in a powder-metallurgic manner is also comparatively complex and cost-intensive due to the high required sintering temperatures.

It is therefore the object of the invention to reduce the manufacturing costs in comparison with the manufacture of solid, i.e. not coated or supported, cobalt foam bodies. In this respect, the mechanical bond created on sintering should not be achieved by a sintering of pure or pre-alloyed cobalt particles and a sufficiently large catalytically usable surface should be maintained.

This object is achieved in accordance with the invention by an element having the features of claim 1. The element can be manufactured using a method in accordance with claim 7. Advantageous embodiments and further developments of the invention can be realized using features specified in subordinate claims.

A catalytically active porous element in accordance with the invention is formed from at least 40% mass of pure cobalt, a cobalt alloy or an intermetallic phase formed with cobalt and at least one further chemical element and/or at least one chemical compound which form a matrix into which cobalt particles are embedded. At least 50% cobalt should preferably be included.

In this respect, the at least one chemical element and/or the at least one chemical compound have a lower sintering temperature and/or melting temperature than cobalt, the respective cobalt alloy or the intermetallic phase. Solely for this purpose or in addition thereto, cobalt can be partially soluble therein and/or can form a eutectic and/or a peritectic together with cobalt.

As a chemical element and/or chemical compound, suitable transition metals, e.g. copper, zinc or manganese, or main group metals, e.g. aluminum or an alloy (preferably a eutectic alloy) or intermetallic phases of these metals, a carbide, a phosphide or a boride, in particular $Co_3B$, can form the matrix. However, alloys and intermetallic phases in which cobalt is included can also be used for this purpose.

A porosity of at least 80% and pore sizes of a maximum of 3 mm should be observed.

The element should have external dimensions which are not larger than 40 mm*40 mm*20 mm and/or the outer radius should be smaller than 40 mm, Favorable thermal relationships and a good throughflow capability, which causes an improved catalytic effect, can thereby be achieved. Disk-shaped elements can, however, also have larger external dimensions.

In addition, at least 50%, preferably at least 70%, of the surface, should be formed by cobalt or by a cobalt alloy.

A polymeric, porous element is coated with a suspension at its surface in the manufacture. The suspension is manufactured using a liquid and at last particles of cobalt, a cobalt alloy or an intermetallic phase in which cobalt is included. In addition, at least one chemical element and/or at least one chemical compound is included in particle form or in a form in the suspension which, on a thermal treatment, forms a matrix of a chemical element and/or of a chemical compound in which cobalt particles, cobalt alloy particles or particles of an intermetallic phase including cobalt are embedded.

In a first thermal treatment, the liquid and/or organic components is/are removed. In a second thermal treatment at an elevated temperature, a melting and/or a sintering of the at least one chemical element and/or of the at least one chemical compound is/are achieved and in this respect the cobalt particles, cobalt alloy particles or particles of an intermetallic phase including cobalt are embedded in the matrix formed by the at least one chemical element and/or by the at least one chemical compound.

The matrix can be formed using the chemical element or the chemical compound included in the suspension. It is, however, also possible that a chemical element or a chemical compound reactively formed or released in a thermal treatment forms the matrix. In this case, a suitable precursor can be included in the suspension and optionally a suitable atmosphere for this purpose can be maintained in at least one of the two thermal treatments. This can e.g. be a reducing atmosphere with hydrogen or forming gas.

The suspension can be manufactured with water and/or with an organic substance, in particular with polyvinyl alcohol and/or pyrrolidone. In this respect, a suitable viscosity can be maintained by maintaining specific solid portions and/or the portion of an organic substance which in this respect preferably also has binder properties.

On a suitable choice of the chemical element and/or chemical compound forming the matrix, cobalt can be partly dissolved in the at least one chemical element and/or in the at least one chemical compound in the second thermal treatment. However, a portion of a phase at least rich in cobalt, in which at least 50% cobalt is included, remains.

Cobalt, a cobalt alloy or an intermetallic phase formed with cobalt can advantageously be used with a mean particle size which is larger than the mean particle size of the at least one chemical element and/or of the at least one chemical compound. The mean particle size should be selected to be at least twice as large as the other particles used. This improves the matrix formation and the portion of the surface which is formed by cobalt can thus additionally be increased. In addition, a sintering of the cobalt particles or of the particles including cobalt can thereby be at least hindered so that these particles are embedded as such in the matrix. The sintering of correspondingly small particles forming the matrix can, however, be facilitated or improved.

It is the object of this second phase, which forms the matrix, to manufacture a mechanical bond; in this respect, this second phase can also be (partly) dissolved again in the process after it has created this bond.

A very good control of the chemical composition can be achieved via the powder-metallurgical manufacture. It can be precluded that no chemical elements harmful for the catalytic effect are included, e.g. no Fe, Ni, Cr, S, Na, Mg, Ca.

The strength of the elements in accordance with the invention can be adapted to the demands of the application, which is possible, for example, by a selection of a suitable density or suitable composition.

In comparison with alternative foam body routes, elements in accordance with the invention are less sensitive to wear and stock removal and form a larger Co reservoir, which allows longer use times. An improved thermal conductivity and a higher heat dissipation can be achieved by a suitable selection of the chemical element forming the matrix or of the respective chemical compound.

The disadvantage which would occur due to the brittle cobalt can be countered using the elements in accordance with the invention through the matrix material which is relatively more ductile.

The invention will be explained in more detail in the following with reference to examples.

EXAMPLE 1

A suspension was prepared with a powder mixture of 38% by mass of an AlCo alloy (cobalt portion: 32% by mass) and 62% by mass of a solid intermetallic phase ($Al_{13}Co_4$) with polyvinyl alcohol as an organic binder. A mean particle size $d_{50}$ of 10 μm was observed. Polyurethane foam bodies having a pore size of 30 ppi and dimensions of 200 mm*100 mm*20 mm were coated with this suspension.

In the first thermal treatment, the material was debound at a temperature up to 600° C. in a hydrogen atmosphere and was heated slowly up to a temperature of 1150° C. in a second thermal treatment.

The intermetallic phase ($Al_{13}Co_4$) degrades at this temperature into a liquid phase and further intermetallic phases. On cooling, the liquid phase forms the matrix as a binding phase between the non-melted CoAl particles.

After the sintering, the density amounted to 0.8 g/cm³.

EXAMPLE 2

A suspension was prepared with a powder mixture of 95% by mass cobalt and 5% by mass $Co_3B$ with polyvinyl alcohol as the organic binder. Polyurethane foam bodies having a pore size of 40 ppi and dimensions of 200 mm*100 mm*20 mm were coated with this suspension. The density of the obtained green compact after drying amounted to 0.7 g/cm³. The particles had mean particle sizes $d_{50}$ of 10 μm.

$Co_3B$ melts incongruently at 1125° C.; in addition, it forms a eutectic with Co with 3.8% by mass B at a temperature of 1110° C.

In the first thermal treatment in a hydrogen atmosphere, the material was debound at a temperature of up to 600° C. and the $Co_3B$ was melted in a second thermal treatment at a temperature of approximately 1150° C. The binding phase which was created on the solidification after cooling between the non-melted particles rich in Co comprised the eutectic mixture and formed the matrix into which cobalt and particles rich in Co were embedded. However, as in Example 1, surface regions were exposed which were formed from cobalt.

EXAMPLE 3

A suspension was prepared with a powder mixture of 68% by mass cobalt and 32% by mass manganese with polyvinyl alcohol as the organic binder. Mean particle sizes $d_{50}$ of 20 μm for cobalt and of 10 μm for manganese were selected. Polyurethane foam bodies having a pore size of 25 ppi and dimensions of 200 mm*100 mm*20 mm were coated with this suspension.

In the first thermal treatment in a hydrogen atmosphere, the material was debound at a temperature of 600° C. and the manganese portion was then at least partly melted in the second thermal treatment at temperatures up to approximately 1250° C. In this respect, the melted manganese was partly separated from the solid cobalt. Cobalt was partly dissolved in the liquid phase of the manganese. A compound of particles rich in cobalt was created which was held together by a matrix somewhat lower in cobalt. Large surface regions of pure cobalt which are catalytically usable were also formed here. The density of the catalyst after sintering amounted to 0.9 g/ccm.

EXAMPLE 4

A suspension was prepared with a powder mixture of 32.25% by mass copper acetate as a precursor for copper and 67.75% by mass cobalt with polyvinyl alcohol as an organic binder. In this respect, mean particle sizes $d_{50}$ of 30 μm were observed.

Polyurethane foam bodies having a pore size of 10 ppi and dimensions of 200 mm*100 mm*20 mm were coated with this suspension.

The organic components were removed in the first thermal treatment in a hydrogen atmosphere at a temperature of up to 600° C. In this respect, the copper acetate was also reduced to copper. The mixture ratio was now 84% by mass cobalt to 16% by mass copper.

The copper portion was then melted at a temperature of approximately 1150° C. in a second thermal treatment in a hydrogen atmosphere. In this mixing ratio, copper and cobalt change from approximately 1110° C. from a solid-solid two-phase region into a liquid-solid two-phase region.

The solid phase extends on the side rich in Co up to approximately 87% by mass cobalt; the liquid phase on the side rich in Cu up to approximately 94.5% by mass copper.

When solidifying, the phase rich in Cu formed the mechanically firm bond, that is a matrix between the non-melted particles rich in Co, so that these particles were embedded into a matrix of copper, with the particles rich in Co not having been completely surrounded by the copper so that a large part of the particles rich in Co are freely accessible and can be used for a catalytic effect. After the sintering, the density amounted to 1 g/cm$^3$.

The invention claimed is:

1. A catalytically active porous element comprising
   a) at least 40% by mass cobalt-containing particles selected from the group consisting of cobalt particles, cobalt alloy particles, and intermetallic phase particles containing cobalt embedded in
   b) a matrix comprising a material having at least one of a lower sintering temperature than the cobalt-containing particles and a lower melting temperature than the cobalt-containing particles.

2. The element of claim 1 wherein the matrix material at least partly dissolves the cobalt-containing particles.

3. The element of claim 1 wherein the matrix material forms a eutectic with the cobalt-containing particles.

4. The element of claim 1 wherein the matrix material forms a peritectic with the cobalt-containing particles.

5. The element of claim 1 wherein the matrix material is a metal selected from the group consisting of copper, aluminum, manganese, zinc, titanium, and cobalt, an alloy of the metal, an intermetallic phase of the metal, a carbide of the metal, a phosphide of the metal, or a boride of the metal.

6. The element of claim 1 wherein the matrix material is Co$_3$B.

7. The element of claim 1 having a porosity of at least 80%.

8. The element of claim 1 having a maximum pore size of 3 mm.

9. The element of claim 1 having external dimensions no larger than 40 mm×40 mm×10 mm.

10. The element of claim 1 having an outer radius smaller than 40 mm.

11. The element of claim 1 having a surface comprising at least 50% cobalt, a cobalt alloy, or an intermetallic phase containing cobalt.

12. A method of making the catalytically active porous element of claim 1 comprising the steps of
    coating a surface of a polymeric porous element with a suspension comprising a liquid containing the cobalt-containing particles and the matrix material,
    removing the liquid from the coated polymeric porous element in a first thermal treatment, and
    melting or sintering the matrix material in a second thermal treatment, such that the cobalt-containing particles are embedded in the matrix.

13. The method of claim 12 wherein the liquid is at least one of water and an organic liquid.

14. The method of claim 12, wherein the liquid is at least one of polyvinyl alcohol and pyrrolidone.

15. The method of claim 12, wherein cobalt in the cobalt-containing particles is partly dissolved in the matrix material during the second thermal treatment.

16. The method of claim 12, wherein the matrix material is present in the suspension as particles having a mean particle size, and wherein the cobalt-containing particles have a mean particle size larger than the mean particle size of the matrix-material particles.

* * * * *